Patented Oct. 14, 1924.

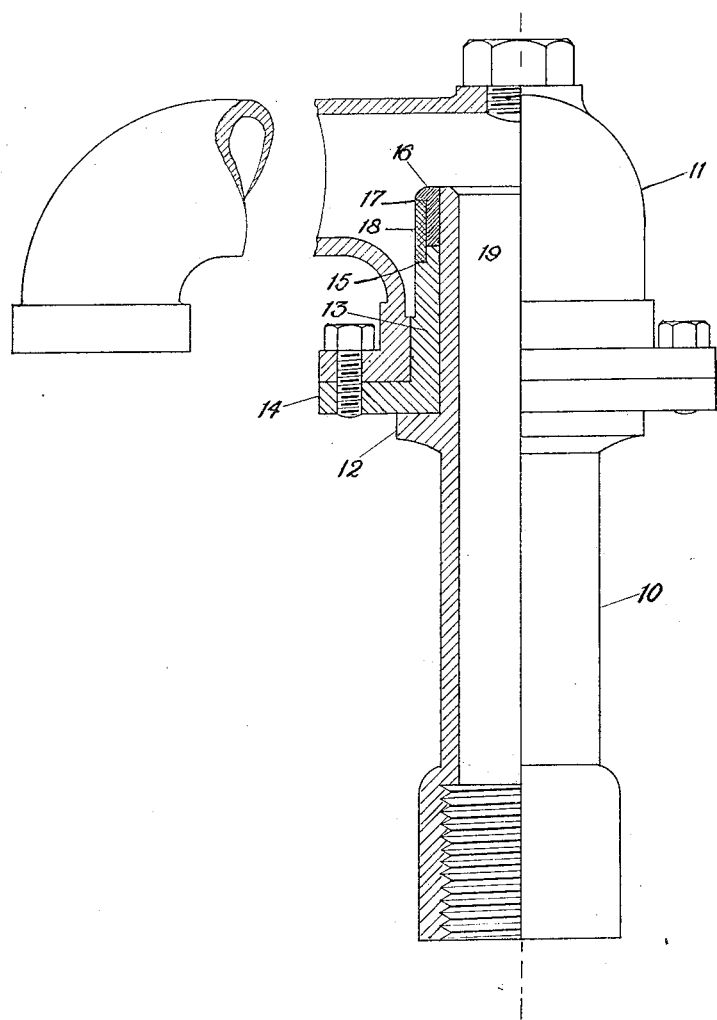

1,511,417

UNITED STATES PATENT OFFICE.

ROBERT McMULLAN, OF FREMANTLE, WESTERN AUSTRALIA, AUSTRALIA.

FLUID-TIGHT JOINT.

Application filed September 27, 1921. Serial No. 503,629.

*To all whom it may concern:*

Be it known that I, ROBERT MCMULLAN, a subject of the King of Great Britain and Ireland, residing at 46 Alexander Road, Fremantle, in the State of Western Australia, Commonwealth of Australia, engineer, have invented an Improvement in Fluid-Tight Joints, of which the following description, in connection with the accompanying drawing, is a specification, like characters on the drawing representing like parts.

This invention relates to an improved fluid tight joint and more particularly relates to an improved fluid tight joint which is to be provided between two hollow members relatively movable about a common axis.

It is well known that hitherto considerable difficulty has been experienced in the above type of joint to maintain the integrity of the seal between the ouside peripheral surface of one member and the inside peripheral surface of the other member.

Now the object of the present invention is to overcome the difficulty above alluded to, that is to say, to provide a joint in which an effective fluid tight seal is maintained without difficulty.

The invention consists broadly in forming a fluid tight joint by covering the circumferentially extending meeting edges of the two relatively movable members with an overlapping band of elastic material in such a way that the elasticity of the band and fluid pressure acts to maintain the effectiveness of the fluid tight joint.

The invention is particularly applicable to the hubs of rotary water sprinklers and to swivelling stand pipes for locomotives but it is not limited in its scope to these purposes being of general application when such a joint is required for fluids generally, due regard being, of course, paid to the selection of a suitable pliable or elastic material.

To enable the invention to be readily understood reference will now be made to the accompanying sheet of explanatory drawings wherein a preferred embodiment of the invention as applied to a stand pipe for locomotives is shown in half sectional elevation.

In the drawings 10 indicates one hollow member and 11 another hollow member which can move relatively and between which it is desired to provide a fluid tight joint. The member 10 which has the smaller internal hollow space is formed with a shoulder 12 near one end, the portion of said member beyond the shoulder constituting a spigot end. A collar 13 encircles this spigot end and rests on the shoulder 12. This collar 13, which is operatively a part of the member 11, is formed with a flange 14 either attached to the member 11 (a suitable washer being interposed) or else formed integral therewith; a shoulder 15 is formed near the other extremity of the collar. The spigot end of the member 10 is longer than the sleeve 13 so that the inner end of the spigot projects through the sleeve and after the collar 13 has been placed in its position a head 16 is formed in a fluid tight manner on the spigot end of the member 10. The head 16 is so proportioned that it is flush with the adjacent outside surface of the collar 13. The head is conveniently provided at the top with a small circumferential shoulder 17 although in some cases it is an advantage to dispense with the same. A band 18 of elastic or pliable material is slipped over the head 16 so as to embrace, cover and overlap the circumferentially extending meeting edges 19 of the upper face of the collar 13 and the underside of the head 16. The band is prevented from slipping downwardy by the small shoulder 15 formed on the collar 13 and held against upward movement (which, of course, is not a normal tendency) by the small shoulder 17 (if such is provided) on the head 16.

The operation of the fluid tight joint is as follows:—On the fluid passing under pressure from one hollow member to the other it will naturally tend to pass between the meeting edges 19 and then pass between the outside periphery of the member 10 and the inner periphery of the collar 13 and thereby leak away into the atmosphere. This aforesaid tendency is, however, entirely prohibited by the band 18 of elastic material which covers the meeting edges 19 and having the pressure of fluid behind it effectively seals the joint, the greater the pressure the tighter being the seal. When the member 11 is turned around radially the head 16 remains stationary whilst the collar 13 turns and the portion in contact with the band 18 frictionally bears against the inside of the latter which normally remains stationary and will in any case maintain the integrity of the seal.

It will obviously be an advantage to have only a small surface of the collar 13 in contact with the band 18 and thereby minimize frictional losses, although the joint will otherwise work satisfactorily even if a larger surface is in contact with the collar 13 than is in contact with the head 16.

I claim:

1. The combination with two hollow members, one extending through the other and having attached to its end a head which forms therewith a fluid tight joint, said head and the other hollow member having circumferential meeting edges which engage each other and an elastic band positively embracing said meeting edges and sealing the joint between them, an action which is supplemented by the pressure of the fluid, substantially as described.

2. A fluid tight joint between two hollow relatively-movable members comprising, in combination, a hollow member, a collar loosely surrounding the same, a head fixed in a fluid tight manner to said hollow member and engaging the collar to prevent displacement thereof in one direction parallel to the common axes of the hollow members, the meeting edges of the head and collar extending circumferentially, another hollow member fixed to and rotatable with the collar, and a band of elastic material positively embracing the meeting edges of the aforesaid head and collar to seal the joint, an action that is supplemented by the pressure of the fluid, substantially as described.

3. A fluid tight joint between two hollow relatively-movable members comprising, in combination, a stationary hollow member having a shoulder formed on the outside thereof, a collar loosely surrounding said member and bearing against the shoulder, said collar having a flange, a head on the outside of the stationary hollow member and secured thereto with a fluid tight joint, a second hollow member fixed to the flange of said collar, and a ring of elastic material embracing the meeting edges of the head and collar.

4. A fluid tight joint between two hollow relatively movable members comprising the combination of a stationary hollow member, a shoulder formed around the outside of the said member, a collar loosely surrounding the said member bearing on the face of the said shoulder, a shoulder formed on the outside periphery of the said collar, a head formed on the outside of the hollow stationary member after the collar has been slipped into position thereby preventing movement of the collar in a plane parallel to the axes of the hollow members, another hollow member fixed to or formed integral with and thereby movable with the said collar, and a ring of pliable material surrounding the meeting edges of the head and collar, the shoulder of the latter preventing the ring from displacement in one direction parallel to the common axes of the hollow members.

5. A fluid tight joint between two hollow relatively movable members comprising, in combination, a stationary hollow member having a shoulder formed on the outside thereof, a collar loosely surrounding said member and bearing on the face of said shoulder, said collar having a flange and a shoulder, another hollow member fixed to said flange, a head fixed to the stationary hollow member in a fluid tight manner and formed with a shoulder and a band of elastic material positively embracing the meeting edges of the aforesaid collar and head, and retained in position between the shoulders on the collar and head.

In witness whereof I have hereunto set my hand this 15th day of August, 1921.

ROBERT McMULLAN.